(12) United States Patent
Shveidel et al.

(10) Patent No.: US 11,513,701 B2
(45) Date of Patent: Nov. 29, 2022

(54) STORAGE MANAGEMENT SYSTEM AND METHOD

(71) Applicant: EMC IP Holding Company, LLC, Hopkinton, MA (US)

(72) Inventors: Vladimir Shveidel, Pardes-Hana (IL); Ronen Gazit, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 57 days.

(21) Appl. No.: 16/402,682

(22) Filed: May 3, 2019

(65) Prior Publication Data

US 2020/0348862 A1 Nov. 5, 2020

(51) Int. Cl.
*G06F 3/06* (2006.01)
*G06F 11/14* (2006.01)
*G06F 16/907* (2019.01)

(52) U.S. Cl.
CPC .......... *G06F 3/0631* (2013.01); *G06F 3/0604* (2013.01); *G06F 3/067* (2013.01); *G06F 3/0652* (2013.01); *G06F 11/1451* (2013.01); *G06F 16/907* (2019.01)

(58) Field of Classification Search
CPC ..... G06F 3/0631; G06F 3/061; G06F 11/1451
See application file for complete search history.

(56) References Cited

U.S. PATENT DOCUMENTS

| | | | |
|---|---|---|---|
| 10,346,360 B1 * | 7/2019 | Basov | G06F 16/172 |
| 2005/0066118 A1 * | 3/2005 | Perry | G06F 11/1469 |
| | | | 711/112 |
| 2012/0047316 A1 * | 2/2012 | Post | G06F 3/061 |
| | | | 711/103 |
| 2012/0143928 A1 * | 6/2012 | Yankov | G06F 12/0804 |
| | | | 707/826 |
| 2017/0286362 A1 * | 10/2017 | Friedman | H04L 67/2842 |
| 2018/0011660 A1 * | 1/2018 | Lesartre | G06F 3/0679 |
| 2018/0046374 A1 * | 2/2018 | Marathe | G06F 12/023 |
| 2018/0232311 A1 * | 8/2018 | Bhati | G06F 12/0897 |

* cited by examiner

*Primary Examiner* — Baboucarr Faal
(74) *Attorney, Agent, or Firm* — Brian J. Colandreo; Mark H. Whittenberger; Holland & Knight LLP

(57) ABSTRACT

A method, computer program product, and computing system for during a high IOPs period, receiving content to be written to a storage system; storing the content to a specific location within a storage device associated with the storage system; updating a temporary map to include an entry that defines the specific location of the content; and during a subsequent period, binding the content with respect to the storage device.

12 Claims, 3 Drawing Sheets

STORAGE MANAGEMENT SYSTEM AND METHOD

TECHNICAL FIELD

This disclosure relates to storage management processes and, more particularly, to storage management processes for use in high-availability storage systems.

BACKGROUND

Storing and safeguarding electronic content is of paramount importance in modern business. Accordingly, various methodologies may be employed to protect and distribute such electronic content, wherein the storage systems that process such content may strive to do so in as an efficient manner as possible. Unfortunately and due to inherent limitations in some of the memory technology utilized in such storage systems, complex methodologies may need to be utilized in order to navigate around such inherent shortcomings.

SUMMARY OF DISCLOSURE

In one implementation, a computer-implemented method is executed on a computing device and includes: during a high IOPs period, receiving content to be written to a storage system; storing the content at a specific location within a storage device associated with the storage system; updating a temporary map to include an entry that defines the specific location of the content; and during a subsequent period, binding the content with respect to the storage device.

One or more of the following features may be included. Binding the content with respect to the storage device may include locating the entry within the temporary map that defines the specific location of the content. Binding the content with respect to the storage device further may further include binding the specific location of the content to metadata associated with the content. Binding the content with respect to the storage device further may further include deleting the entry from the temporary map. The subsequent period may be a period of low IOPs for the storage system. The subsequent period may be a period of low resources for the temporary map. The temporary map may be backed up onto persistent memory.

In another implementation, a computer program product resides on a computer readable medium and has a plurality of instructions stored on it. When executed by a processor, the instructions cause the processor to perform operations including during a high IOPs period, receiving content to be written to a storage system; storing the content at a specific location within a storage device associated with the storage system; updating a temporary map to include an entry that defines the specific location of the content; and during a subsequent period, binding the content with respect to the storage device.

One or more of the following features may be included. Binding the content with respect to the storage device may include locating the entry within the temporary map that defines the specific location of the content. Binding the content with respect to the storage device further may further include binding the specific location of the content to metadata associated with the content. Binding the content with respect to the storage device further may further include deleting the entry from the temporary map. The subsequent period may be a period of low IOPs for the storage system. The subsequent period may be a period of low resources for the temporary map. The temporary map may be backed up onto persistent memory.

In another implementation, a computing system includes a processor and memory is configured to perform operations including during a high IOPs period, receiving content to be written to a storage system; storing the content at a specific location within a storage device associated with the storage system; updating a temporary map to include an entry that defines the specific location of the content; and during a subsequent period, binding the content with respect to the storage device.

One or more of the following features may be included. Binding the content with respect to the storage device may include locating the entry within the temporary map that defines the specific location of the content. Binding the content with respect to the storage device further may further include binding the specific location of the content to metadata associated with the content. Binding the content with respect to the storage device further may further include deleting the entry from the temporary map. The subsequent period may be a period of low IOPs for the storage system. The subsequent period may be a period of low resources for the temporary map. The temporary map may be backed up onto persistent memory.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
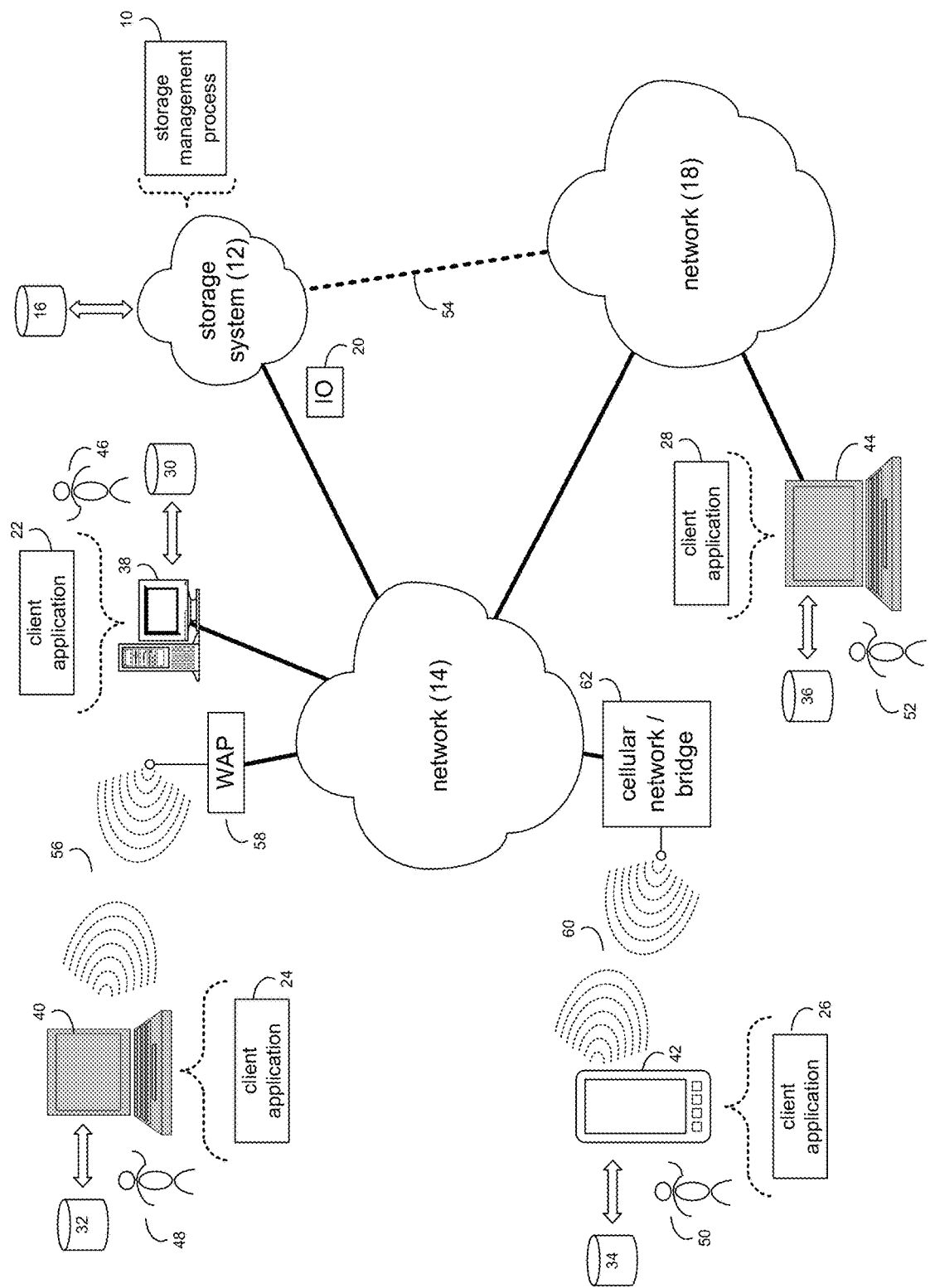
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a personal computer with a memory system, a server computer with a memory system, a Network Attached Storage (NAS) system, a Storage Area Network (SAN) and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 coupled to storage system 12, may be executed by one or more processors (not shown) and one or more memory architectures (not shown) included within storage system 12.

Storage device 16 may include but is not limited to: a hard disk drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

Figure 2:
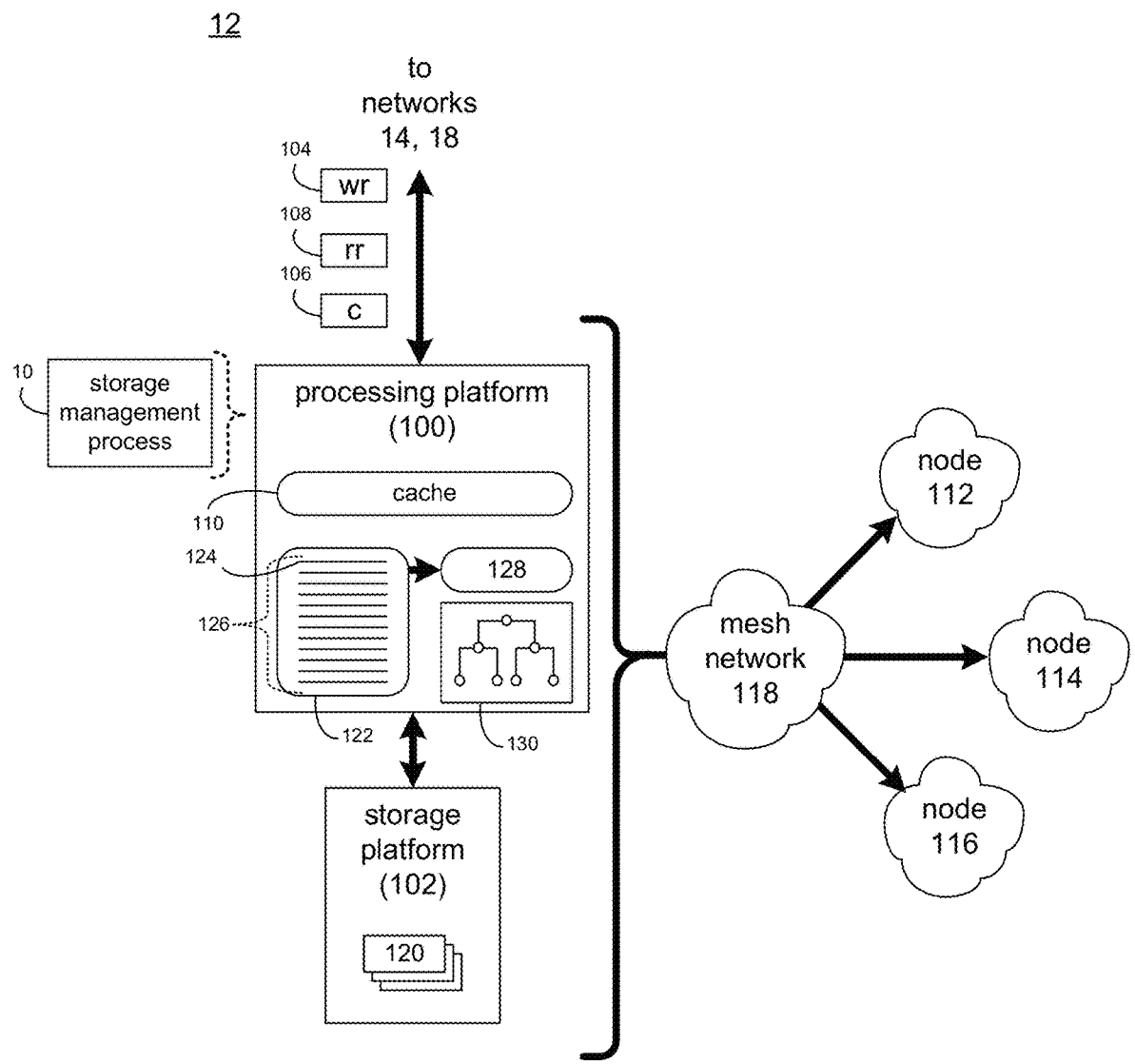
FIG. 2 is a diagrammatic view of the storage system of FIG. 1.

The Data Storage System:

Referring also to FIG. 2, there is shown a general implementation of storage system 12. In this general implementation, storage system 12 may include processing platform 100, wherein processing platform 100 may be configured to perform computational tasks and may be configured to store data within storage platform 102.

Depending on the manner in which storage system 12 is configured, storage platform 102 may include a single storage device (such as a single hard disk drive or a single solid state storage device) or may include a plurality of storage devices that are configured to provide various levels of performance and/or high availability. For example and if storage platform 102 includes a plurality of storage devices (e.g., hard disk drives and/or solid state storage devices), this plurality of storage devices may be configured to form a RAID array utilizing various standard RAID structures (e.g., RAID 0, RAID 1, RAID 3, RAID 5, RAID 6, RAID 7 or RAID 10), thus providing a higher level of performance and/or availability.

Storage system 12 may be configured to execute all or a portion of storage management process 10. The instruction sets and subroutines of storage management process 10, which may be stored on a storage device (e.g., storage device 16) coupled to processing platform 100, may be executed by one or more processors (not shown) and one or more memory architectures (not shown) included within processing platform 100. Storage device 16 may include but is not limited to: a hard disk drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage system 12 is configured as an application server, these IO requests may be internally generated within storage system 12. Examples of IO request 20 may include but are not limited to data write request 104 (i.e. a request that content 106 be written to storage system 12) and data read request 108 (i.e. a request that content 106 be read from storage system 12).

During operation of processing platform 100, content 106 to be written to storage system 12 may be processed by processing platform 100. Additionally/alternatively and when storage system 12 is configured as an application server, content 106 to be written to storage system 12 may be internally generated by processing platform 100.

Processing platform 100 may include cache memory system 110. Examples of cache memory system 110 may include but are not limited to a volatile, solid-state, cache memory system (e.g., a dynamic RAM cache memory system) and/or a non-volatile, solid-state, cache memory system (e.g., a flash-based, cache memory system). Processing platform 100 may initially store content 106 within cache memory system 110. Depending upon the manner in which cache memory system 110 is configured, processing platform 100 may immediately write content 106 to storage platform 102 (if cache memory system 110 is configured as a write-through cache) or may subsequently write content 106 to storage platform 102 (if cache memory system 110 is configured as a write-back cache).

Storage system 12 may be configured to include a plurality of processing platforms and/or storage platforms (wherein a processing platform and a storage platform may collectively constitute a node). For example and in addition to processing platform 100/storage platform 102, storage system 12 may include (in this example) three additional nodes (e.g., nodes 112, 114, 116), each of which (as discussed above) may include a processing platform and a storage platform (not shown), wherein each of these nodes (e.g., nodes 112, 114, 116) may be coupled via a mesh network (e.g., mesh network 118).

As could be imagined, there are times when storage system 12 may be more busy and times when storage system 12 may be less busy. For example, it is easily foreseeable that there would be a certain times during the day when reports would be generated and storage system 12 may be very busy. It is also easily foreseeable that there would be times during the day (e.g. after normal business hours) when storage system 12 may be less busy.

Specifically, modern storage systems (e.g., storage system 12) may be configured to sustain long periods of high IOPs (i.e., Input/Output Operations per Second). Typically, the fleeting nature of these high IOPs periods doesn't necessarily require that storage system 12 be configured to indefinitely sustain these high IOPs periods . . . but only that storage system 12 be capable of temporarily sustaining these high IOPs periods. Accordingly and as will be explained below in greater detail, storage system 12 may be configured to adapt to varying IOPs patterns so that it may sustain high IOPs periods by postponing the computational expensive processing part of a storage operation (as much as possible) until a less busy period (e.g., a low IOPs period).

Figure 3:
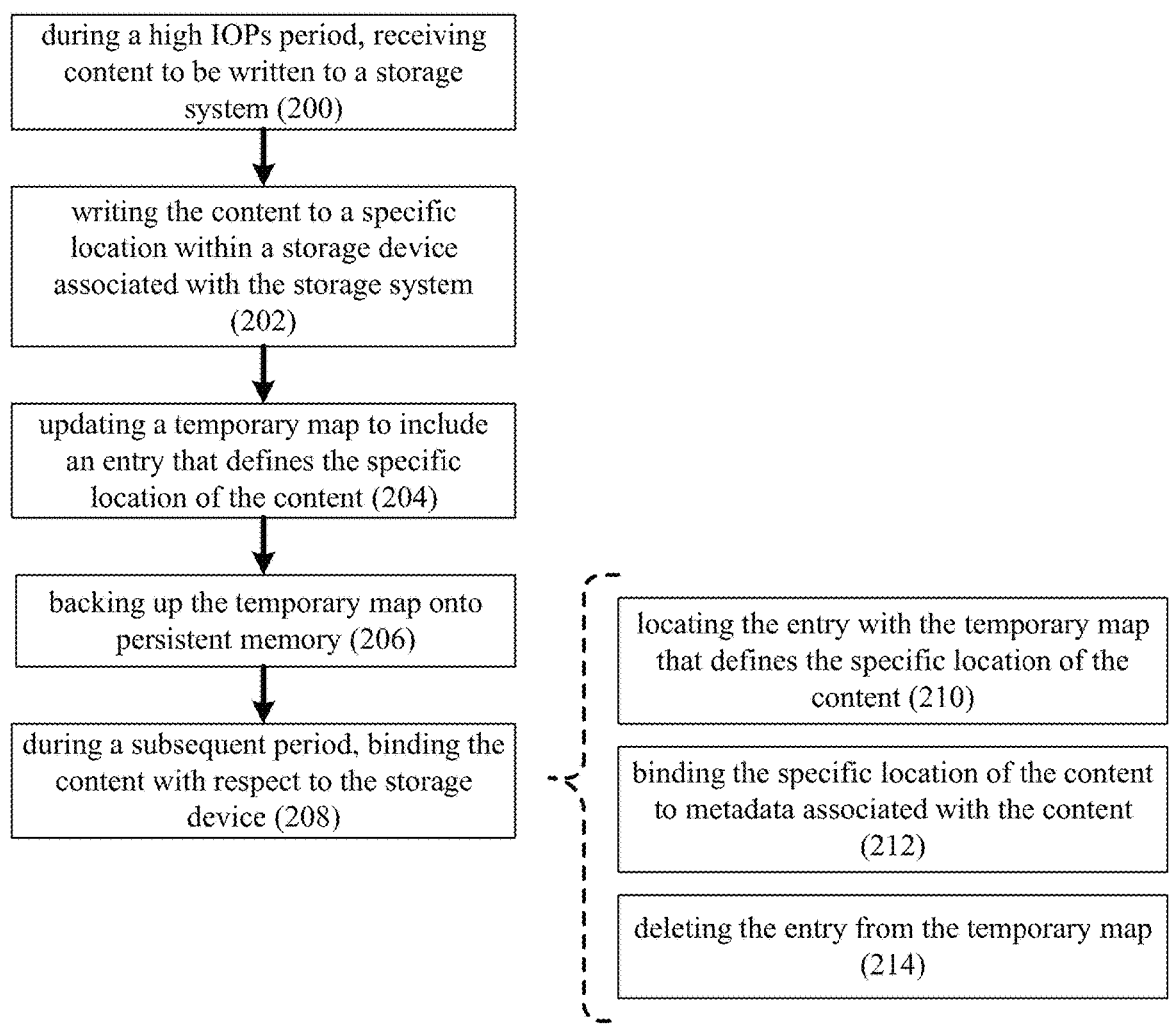
FIG. 3 is a flow chart of the storage management process of FIG. 1.

Accordingly and referring also to FIG. 3, storage management process 10 may receive 200 content (e.g., content 16) to be written to a storage system (e.g., storage system 12) during a high IOPs period. An example of such a high IOPs period may include but is not limited to when storage system 12 is being extensively utilized (e.g., a time period during which backup procedures are being performed; a time period during which reports are being generated, or a time period during which data replication is being effectuated). When the content (e.g., content 16) to be stored on storage system 12 is initially received, such content may be temporarily stored within cache memory system 110 prior to being written to storage platform 102. Shortly thereafter, storage management process 10 may store 202 the content (e.g., content 16) at a specific location within a storage device associated with storage system 12.

As discussed above, storage platform 102 may include a single storage device (e.g., a single hard disk drive or a single solid state storage device) or may include a plurality of storage devices (e.g., a plurality of hard disk drives or a plurality of solid state storage device) that may be configured to provide various levels of performance and/or high availability. For this example, assume that storage platform 102 includes plurality of storage devices 120, wherein these storage devices may be organized into smaller quantities of physical space that may be referred to as a physical large block (PLB), which may be a standard size (e.g., 2 megabytes of physical space). A large quantity (e.g., >1000) of these physical large blocks (PLBs) may be grouped together to form storage platform 102. For this example, assume that storage management process 10 stores 202 content 116 at address ABC within storage device XYZ (chosen from plurality of storage devices 120).

During use of storage system 12, data (e.g., in the form of blocks) may be written to storage platform 102. As would be expected, these blocks written to storage platform 102 may become outdated over time due to files being overwritten or updated. Accordingly, storage management process 10 may utilize garbage collection methodologies to reclaim storage space within storage platform 102 that was utilized by older versions of file(s). In computer science, garbage collection is a form of automatic memory management. The garbage collector, or just the collector, attempts to reclaim garbage, or memory occupied by objects that are no longer in use by the program. Garbage collection was invented by John McCarthy around 1959 to simplify manual memory management in Lisp. Garbage collection is essentially the opposite of manual memory management, which requires the programmer to specify which objects to deallocate and return to the memory system. However, many systems use a combination of approaches, including other techniques such as stack allocation and region inference.

Storage management process 10 may update 204 a temporary map (e.g., temporary map 122) to include an entry (e.g., entry 124) that defines (i.e., points to) the specific location (e.g., address ABC within storage device XYZ) of content 116 within storage platform 102 (generally) and plurality of storage devices 120 (specifically). During use of storage system 12, storage management process 10 may receive 200 additional content to be written to storage system 12 (during high IOPs periods) and may further update 204 temporary map 122 to include additional entries that define the specific locations of this additional content, resulting in plurality of entries 126 within temporary map 122.

Temporary map 122 may be stored within volatile memory (e.g., such as static random access memory) included within processing platform 100. In order to provide a high level of availability for temporary map 122, storage management process 10 may back up 206 temporary map 122 onto persistent (e.g., flash based) memory 128 included within processing platform 100. When backing up 206 temporary map 122 to persistent (e.g., flash-based) memory 128 included within processing platform, temporary map 122 may be written in a log-structured format. As is known in the art and when writing data to a memory device in a log-structured format, this data may be written in a sequential fashion (which is very efficient for writing data and reading data but is less efficient for searching reading data). Specifically, temporary map 122 may be stored within volatile memory (e.g., such as static random access memory) as a binary tree that allows for efficient searching. However, when temporary map 122 is backed up 206 to persistent (e.g., flash-based) memory 128, it may be written in a log-structured format (which is generally unsearchable and only useable for recovery/restoration purposes).

Delayed Binding Operation

Instead of immediately binding this received content (e.g., content 116) with respect to the storage device (e.g., chosen from plurality of storage devices 120) on which this content is stored, storage management process 10 may delay the execution of this binding operation until a subsequent period. Accordingly and in the event that a read request is received by storage system 12 for e.g., content 116 prior to the execution of this binding operation, storage management process 10 may utilize (in this example) entry 124 within temporary map 122 to locate and retrieve content 116 from storage device(s) 120.

One example of such a subsequent period may include but is not limited to a period of low IOPs for storage system 12. Specifically, such binding operations are computation expensive (e.g., as they require considerable calculations to perform) and somewhat disruptive (e.g., as they require the locking of various portions of one or more of the plurality of storage devices 120 and/or the storage device on which temporary map 122 is stored).

Another example of such a subsequent period may include but is not limited to a period of low resources for temporary map 122. As discussed above, temporary map 122 may be stored within volatile memory (e.g., such as static random access memory) included within processing platform 100. Further and as discussed above, storage management process 10 may receive 200 additional content to be written to storage system 12 and may update 204 temporary map 122 to include additional entries (resulting in plurality of entries 126). Accordingly and during certain periods, the resources (e.g., memory/storage space) associated with temporary map 122 may run low.

Regardless of the basis of this subsequent period, storage management process 10 may bind 208 the content (e.g., content 16) with respect to the storage device (e.g., one or more of plurality of storage devices 120) during this subsequent period. For the following example, assume that storage system 12 experiences a period of low IOPs, thus allowing storage management process 10 to initiate the above-referenced binding process. Accordingly, storage management process 10 may sequentially process plurality of entries 126 included within temporary map 122.

For example and when binding 208 the content (e.g., content 16) with respect to the storage device (e.g., one or more of plurality of storage devices 120), storage management process 10 may locate 210 the entry (e.g., entry 124) within temporary map 122 that defines the specific location (e.g., address ABC within storage device XYZ) of content 116.

Additionally and when binding 208 the content (e.g., content 16) with respect to the storage device (e.g., one or more of plurality of storage devices 120), storage management process 10 may bind 212 the specific location (e.g., address ABC within storage device XYZ) of content 116 to metadata associated with the content (e.g., content 16).

Specifically, storage management process 10 may bind, build and update leaf, mid and top metadata within a binary tree (e.g., binary tree 130), wherein:

Leaf Metadata: Each leaf-level pointer may represent a specific LBA and may point to a specific virtual pointer, wherein each leaf-level pointer may be responsible for mapping 2 megabytes (e.g., 512×4 Kb) of consequent logical address space.

Mid Metadata: Each mid-level pointer may contain pointers to leaf-level pointers, wherein each mid-level pointer may be responsible for mapping 1 gigabyte (e.g., 512×2 mb) of consequent address space.

Top Metadata: Each top-level pointer may contain pointers to mid-level pointers, wherein each top-level pointer may be responsible for mapping 512 gigabytes (512×1 GB) of consequent address space.

Further and when binding 208 the content (e.g., content 16) with respect to the storage device (e.g., one or more of plurality of storage devices 120), storage management process 10 may delete 214 the entry (e.g., entry 124) from temporary map 122. Accordingly, once the specific location of content 116 is bound 212 to metadata associated with content 116, storage management process 10 may delete 214 the entry (e.g., entry 124) from temporary map 122 (thus freeing up memory space).

Accordingly and during normal operation of storage system 12, when a read request is received for data on storage system 12, temporary map 122 may first be searched to determine if the content sought is defined within (and locatable through) an entry within temporary map 122. If so, the content sought may be retrieved from storage platform 102 through the entry within temporary map 122. If not, binary tree 130 may be searched next to determine if the content sought is defined within (and locatable through) an entry within binary tree 130. If so, the content sought may be retrieved from storage platform 102 through the entry within binary tree 130.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   during a high IOPs period, receiving content to be written to a storage system;
   storing the content at a specific location within a storage device associated with the storage system;
   updating a temporary map within volatile memory of the storage system to include an entry that defines the specific location of the content, wherein the temporary map within the volatile memory of the storage system is a binary tree;
   backing up the temporary map onto persistent memory in a log-structured format; and
   during a subsequent period, binding the content with respect to the storage device, building and updating metadata associated with the content within the temporary map, wherein the subsequent period is a period of low IOPs for the storage system and a period of low resources for the temporary map, wherein binding the content with respect to the storage device includes binding the specific location of the content to metadata associated with the content and reclaiming one or more outdated data blocks within the storage device.

2. The computer-implemented method of claim 1 wherein binding the content with respect to the storage device includes:
   locating the entry within the temporary map that defines the specific location of the content.

3. The computer-implemented method of claim 2 wherein binding the content with respect to the storage device further includes:
   deleting the entry from the temporary map.

4. The computer-implemented method of claim 1, wherein binding the content with respect to the storage device, building and updating metadata associated with the content within a binary tree includes binding, building and updating leaf metadata, mid metadata, and top metadata within the binary tree.

5. The computer-implemented method of claim 1, wherein the storage platform includes a plurality of storage devices organized into physical large blocks (PLBs).

6. The computer-implemented method of claim 5, wherein the PLBs are each two megabytes in size.

7. A computer program product residing on a non-transitory computer readable medium having a plurality of instructions stored thereon which, when executed by a processor, cause the processor to perform operations comprising:
   during a high IOPs period, receiving content to be written to a storage system;
   storing the content at a specific location within a storage device associated with the storage system;
   updating a temporary map within volatile memory of the storage system to include an entry that defines the specific location of the content, wherein the temporary map within the volatile memory of the storage system is a binary tree;

backing up the temporary map onto persistent memory in a log-structured format; and during a subsequent period, binding the content with respect to the storage device, building and updating metadata associated with the content within the temporary map, wherein the subsequent period is a period of low IOPs for the storage system and a period of low resources for the temporary map, wherein binding the content with respect to the storage device includes binding the specific location of the content to metadata associated with the content and reclaiming one or more outdated data blocks within the storage device.

8. The computer program product of claim 7 wherein binding the content with respect to the storage device includes:

locating the entry within the temporary map that defines the specific location of the content.

9. The computer program product of claim 8 wherein binding the content with respect to the storage device further includes:

deleting the entry from the temporary map.

10. A computing system including a processor and memory configured to perform operations comprising:

during a high IOPs period, receiving content to be written to a storage system;

storing the content at a specific location within a storage device associated with the storage system;

updating a temporary map within volatile memory of the storage system to include an entry that defines the specific location of the content, wherein the temporary map within the volatile memory of the storage system is a binary tree;

backing up the temporary map onto persistent memory in a log-structured format; and during a subsequent period, binding the content with respect to the storage device, building and updating metadata associated with the content within the temporary map, wherein the subsequent period is a period of low IOPs for the storage system and a period of low resources for the temporary map, wherein binding the content with respect to the storage device includes binding the specific location of the content to metadata associated with the content and reclaiming one or more outdated data blocks within the storage device.

11. The computing system of claim 10 wherein binding the content with respect to the storage device includes:

locating the entry within the temporary map that defines the specific location of the content.

12. The computing system of claim 11 wherein binding the content with respect to the storage device further includes:

deleting the entry from the temporary map.

* * * * *